May 9, 1950  J. SILVIA  2,506,898
ANIMAL TRAP
Filed April 8, 1949
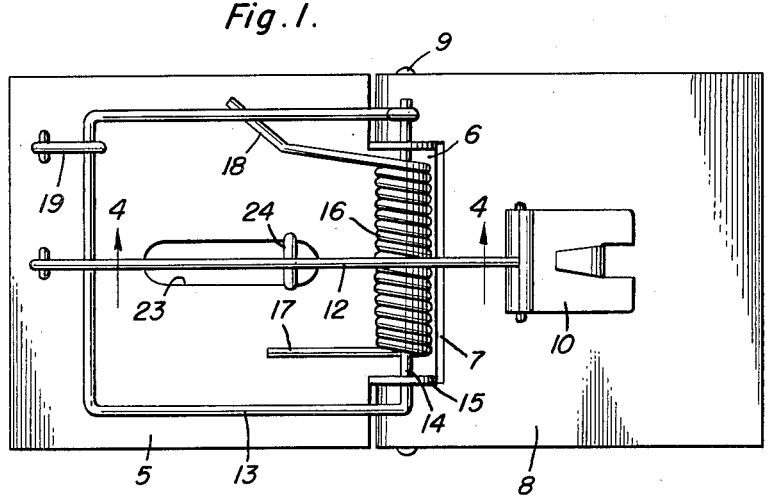
Fig. 1.
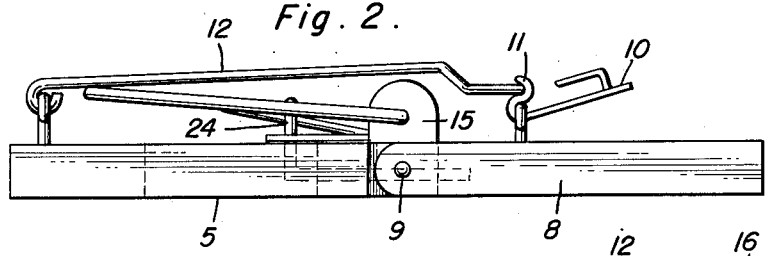
Fig. 2.
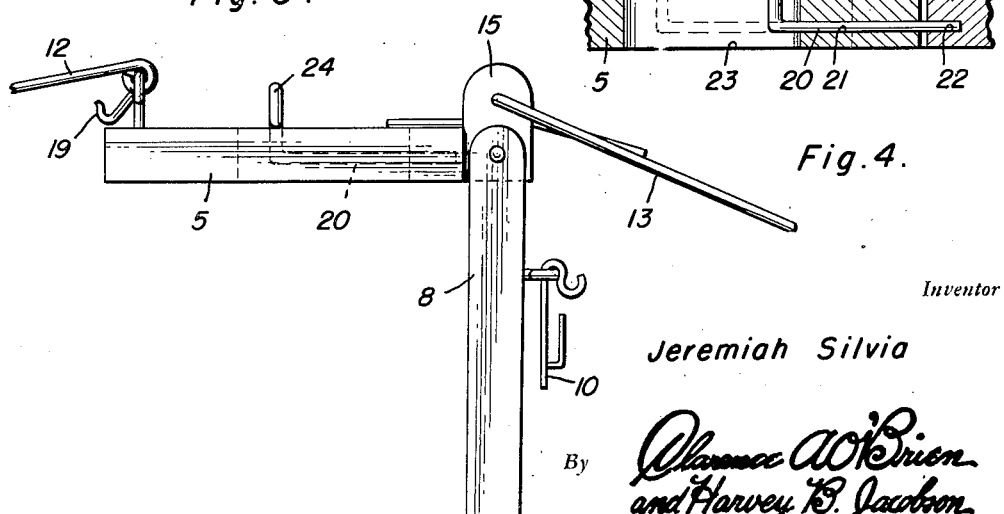
Fig. 3.
Fig. 4.
Inventor
Jeremiah Silvia
By Clarence A. O'Brien
and Harvey B. Jacobson
Attorneys

Patented May 9, 1950

2,506,898

UNITED STATES PATENT OFFICE 2,506,898

ANIMAL TRAP

Jeremiah Silvia, Mattapoisett, Mass.

Application April 8, 1949, Serial No. 86,338

2 Claims. (Cl. 43—81)

The present invention relates to new and useful improvements in animal traps of the spring jaw type designed primarily for catching small animals, such as rats and mice.

An important object of the present invention is to provide an animal trap of this character embodying means to facilitate the release of the animal, when caught, without necessitating handling thereof.

A further object of the invention is to provide a pivoted platform for the trap on which the bait holder is mounted and operable to release the spring jaw of the trap by the weight of the animal on the platform.

Another object of the invention is to provide a locking device for the pivoted platform and which is shielded from accidental unlocking movement by the trigger of the trap.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view showing the trap in a set position;

Figure 3 is a similar view showing the trap released and with the locking device for the pivoted platform retracted to release the platform for removing the animal; and Figure 4 is an enlarged fragmentary sectional view taken on a line 4—4 of Figure 1.

Referring now to the drawing in detail wherein, for the purpose of illustration, I have disclosed a preferred embodiment of the invention, the numeral 5 designates the base of the trap, which may be in the form of a rectangular piece of wood or other suitable material having an extension 6 at the central portion of its front edge positioned in a recess 7 at the central portion of the rear edge of a platform 8 for pivotally attaching the platform to the extension 6 by means of a transverse pin 9 for vertical swinging movement of the platform relative to the base.

A conventional type of pivoted bait holder 10 is mounted on platform 8 and includes a forwardly overhanging lip 11 for engaging the rear end of a trigger 12 which overlies the base and is pivoted at its other end to the base adjacent its rear edge. The trigger 12 overlies a conventional type of spring-actuated wire jaw 13 mounted on base 5 to hold the jaw in a set position. The inner end of jaw 13 is provided with a transverse bar 14 pivoted in a pair of upstanding apertured ears 15 secured at the side edges of extension 6 by means of the pivot pin 9 and the coil spring 16 for actuating jaw 13 is also mounted on the bar 14 with one end 17 of the spring resting on the base 5 and the other end 18 of the spring engaged under one side of the jaw. The jaw 13 is secured in its set position by means of a hook 19 secured to the rear portion of base 5 while the trigger 12 and bait holder 10 are being set and to prevent accidental closing of the jaw.

The platform 8 is locked to the base 5 in a position coplanar therewith by means of a sliding locking bolt or pin 20 which is slidably positioned in a longitudinal bore 21 in the front end of base 5 for entering the front end of the bolt in a recess 22 in the rear edge of platform 8. The rear end of bolt 22 is bent upwardly in a longitudinal slot 23 in base 5 to provide a handle 24 projecting upwardly above the surface of base 5 to a position for conveniently gripping the handle to move the bolt forwardly or rearwardly into and out of its locking positions.

When the trap is set, the trigger 12 overlies the handle 24 to function as a shield for the handle to prevent accidental movement of the bolt.

In the operation of the device, the platform 8 is locked in a rigid position to the front end of base 5 by the locking pin or bolt 20 when moved forwardly to enter recess 22 in the platform. The trap is then set and sprung in the usual manner and the jaw 13 holds the animal on platform 8 when the trap is sprung.

The trigger 12 then swings free from its position overlying handle 24 and the handle may then be moved rearwardly to retract bolt 20, whereupon platform 8 is free to swing downwardly away from jaw 13 to release the animal for disposal without necessitating handling thereof.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended Having described the invention, what is claimed as new is:

1. An animal trap comprising a base having a spring-actuated pivoted jaw thereon, a platform pivoted to one edge of the base in a position underlying the jaw when closed, and a sliding bolt carried by the base and engaging the pivoted edge of the platform to lock the platform in a position coplanar with the base.

2. An animal trap comprising a base having a spring-actuated pivoted jaw thereon, a platform pivoted to one edge of the base in a position underlying the jaw when closed, said base having a longitudinal slot, a sliding bolt carried by the base and engaging the platform at its pivoted edge to lock the platform in a position coplanar with the base, and a handle for the bolt projecting upwardly through the slot.

JEREMIAH SILVIA.

REFERENCES CITED

The following references are of record in the file of this patent:

UNITED STATES PATENTS

| Number | Name | Date |
|---|---|---|
| 615,218 | Hotchkiss | Nov. 29, 1898 |